(12) United States Patent
Lang et al.

(10) Patent No.: US 9,889,808 B2
(45) Date of Patent: Feb. 13, 2018

(54) METHOD AND DEVICE FOR ACTIVATING A PEDESTRIAN PROTECTION MEANS FOR A VEHICLE, AND RESTRAINT SYSTEM FOR A VEHICLE

(71) Applicant: Robert Bosch GmbH, Stuttgart (DE)

(72) Inventors: Gunther Lang, Stuttgart (DE); Bastian Reckziegel, Kirchheim/Nabern (DE); Marlon Ramon Ewert, Ditzingen-Hirschlanden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 182 days.

(21) Appl. No.: 14/701,212

(22) Filed: Apr. 30, 2015

(65) Prior Publication Data
US 2015/0314744 A1 Nov. 5, 2015

(30) Foreign Application Priority Data
Apr. 30, 2014 (DE) .................. 10 2014 208 143

(51) Int. Cl.
| | |
|---|---|
| *B60R 21/13* | (2006.01) |
| *B60R 21/013* | (2006.01) |
| *B60R 21/0136* | (2006.01) |
| *B60R 21/00* | (2006.01) |
| *B60R 21/01* | (2006.01) |

(52) U.S. Cl.
CPC ........ *B60R 21/013* (2013.01); *B60R 21/0136* (2013.01); *B60R 2021/0027* (2013.01); *B60R 2021/01013* (2013.01)

(58) Field of Classification Search
CPC ............. B60R 21/013; B60R 21/0136; B60R 2021/0027; B60R 2021/01013; B60R 19/18; B60R 19/48; B60R 19/483; B60R 19/186
See application file for complete search history.

(56) References Cited

U.S. PATENT DOCUMENTS

| | | | |
|---|---|---|---|
| 6,771,208 | B2 | 8/2004 | Lutter et al. |
| 2004/0186643 | A1 | 9/2004 | Tanaka et al. |
| (Continued) | | | |

FOREIGN PATENT DOCUMENTS

| | | |
|---|---|---|
| CN | 1532094 A | 9/2004 |
| CN | 101674959 A | 3/2010 |
| DE | 102010018400 | 10/2010 |

*Primary Examiner* — Steven Lim
*Assistant Examiner* — Mancil Littlejohn, Jr.
(74) *Attorney, Agent, or Firm* — Norton Rose Fulbright US LLP; Gerard Messina (57) ABSTRACT

A method is provided for activating a pedestrian protection system of a vehicle. The method includes a step of carrying out a first threshold value comparison, in the first threshold value comparison at least one signal feature of a first sensor signal being compared to an adaptation threshold value, a step of determining a threshold value adaptation value based on a result of the first threshold value comparison, and a step of carrying out a second threshold value comparison. In the second threshold value comparison, at least one signal feature of a second sensor signal is compared to a triggering threshold value, which is adapted using the threshold value adaptation value, for triggering the pedestrian protection system.

11 Claims, 4 Drawing Sheets

(56) References Cited

U.S. PATENT DOCUMENTS

| | | | | |
|---|---|---|---|---|
| 2006/0283266 A1* | 12/2006 | Qing | ............... | G01D 5/35383 |
| | | | | 73/862.041 |
| 2009/0312949 A1* | 12/2009 | Suzuki | ............... | B60R 21/0136 |
| | | | | 701/301 |
| 2010/0042296 A1* | 2/2010 | Brandmeier | ............... | B60R 21/0132 |
| | | | | 701/46 |
| 2011/0043344 A1* | 2/2011 | Nichols | ............... | B60R 21/0136 |
| | | | | 340/436 |

* cited by examiner

METHOD AND DEVICE FOR ACTIVATING A PEDESTRIAN PROTECTION MEANS FOR A VEHICLE, AND RESTRAINT SYSTEM FOR A VEHICLE

FIELD OF THE INVENTION

The present invention relates to a method for activating a pedestrian protection means, for example a pedestrian protection device of a vehicle, a corresponding device, and a corresponding computer program, and a restraint system for a vehicle.

BACKGROUND INFORMATION

Sensor systems which are installed in the vehicle front end are used for detecting pedestrian accidents. Systems based on two or more acceleration sensors are widely used. Corresponding sensors for detecting a collision of a pedestrian with a vehicle are referred to as pedestrian collision sensors (PCSs). Pressure tube-based systems have also become available in recent times. A so-called pressure tube sensor (PTS) is used here. For the acceleration-based systems as well as the pressure tube-based systems, the collision of an object in the relevant area of the bumper results in a signal increase within the detecting sensor system. The amplitude of the detected signals is a function of, among other things, the mass and the speed of the object which is struck.

German Published Patent Application No. 10 2010 018 400 describes a sensor system device for detecting an impact on a vehicle which includes at least one first sensor situated on the vehicle, the first sensor being a pressure sensor.

SUMMARY

Against this background, using the approach provided here, a method for activating a pedestrian protection means for a vehicle, a device which uses this method, a restraint system for a vehicle, and lastly, a corresponding computer program, are provided.

An adaptation of an evaluation of signals of at least one pressure sensor of a vehicle based on signals of at least one acceleration sensor of the vehicle, or conversely, an adaptation of an evaluation of signals of at least one acceleration sensor of a vehicle based on signals of at least one pressure sensor of the vehicle, may ensure an improved triggering response of a pedestrian protection means of the vehicle.

A method for activating a pedestrian protection means for a vehicle is provided, the method including the following steps:

carrying out a first threshold value comparison, in the first threshold value comparison at least one signal feature of a first sensor signal being compared to an adaptation threshold value;

determining a threshold value adaptation value based on a result of the first threshold value comparison; and carrying out a second threshold value comparison, in the second threshold value comparison at least one signal feature of a second sensor signal being compared to a triggering threshold value, which is adapted using the threshold value adaptation value, for triggering the pedestrian protection means, the first sensor signal representing a pressure signal of a pressure sensor of the vehicle and the second sensor signal representing an acceleration signal of an acceleration sensor of the vehicle, or the first sensor signal representing an acceleration signal of an acceleration sensor of the vehicle and the second sensor signal representing a pressure signal of a pressure sensor of the vehicle.

The steps of the method may be carried out using one or multiple suitable algorithms, for example in a control unit of the vehicle. The pedestrian protection means may be a collision protection system or a person protection system which is installed in the vehicle. In particular, the pedestrian protection means may be designed in the form of a pedestrian protection device whose task is to absorb or mitigate an impact of persons outside the vehicle with the vehicle in order to at least reduce a risk of injury to the persons. In this regard, the pedestrian protection means may be an active hood or a window airbag, for example. Of course, the pedestrian protection device may also be used for protecting cyclists or any objects colliding with the vehicle.

The pressure sensor may be a PTS which is integrated into a bumper of the vehicle, for example. Via a silicone tube filled with air, for example, which is coupled to the two pressure sensors, the pressure sensors are able to detect an impact of an object on the bumper via a change in pressure in the silicone tube, and to output the corresponding first or second signal. The acceleration sensor may be a PCS or an upfront sensor of the vehicle which is used for recognizing a head-on collision. The acceleration sensor may likewise be situated in the bumper or in some other area of the vehicle. The signal features may be components of the sensor signals, such as integrals or derivatives of the sensor signals, which are determined or computed from the sensor signals, or may be raw signals.

With the aid of the first threshold value comparison, it may be determined, for example, whether or not the signal feature, for example a raw signal, of the first sensor signal exceeds the adaptation threshold value. The adaptation threshold value may be an auxiliary value of the method, in the sense that, for example, an exceedance of the adaptation threshold value by the first signal feature may result in an adaptation of the triggering threshold value for triggering the pedestrian protection means. In the step of determining the threshold value adaptation value, the threshold value adaptation value may be determined when, as a result of the first threshold value comparison, the condition exists that the first signal feature exceeds the adaptation threshold value, or by what amount the first signal feature exceeds the adaptation threshold value. By use of the threshold value adaptation value, the triggering threshold value may be reduced, for example. With the aid of the second threshold value comparison, it may be determined whether or not the signal feature of the second sensor signal exceeds the triggering threshold value. If the triggering threshold value is exceeded by the second sensor signal, in response, an activation or trigger signal for activating the pedestrian protection means may be output to an interface of the pedestrian protection means.

According to one specific embodiment, the method may include a step of providing a result of the second threshold value comparison as a decision for activating the pedestrian protection means. The activation of the pedestrian protection means may thus be ensured in a simple and robust manner.

According to another specific embodiment, the method may include a step of determining the at least one signal feature of the first sensor signal from the first sensor signal, and/or determining the at least one signal feature of the second sensor signal from the second sensor signal, using a predefined determination rule. Certain relevant aspects of the first or second sensor signal may thus be intensified in order to advantageously increase the informative value of the first or second sensor signal with regard to a classification of a detected collision with the vehicle.

In particular, the predefined determination rule may include filtering the first sensor signal and/or the second sensor signal, or determining an integral of the first sensor signal and/or of the second sensor signal, or determining a window integral of the first sensor signal and/or of the second sensor signal, or determining a derivative of the first sensor signal and/or of the second sensor signal. According to this specific embodiment, the signal features may be defined particularly easily and quickly.

The method may also include a step of carrying out a plausibility determination of the first sensor signal, using the second sensor signal, and/or of the second sensor signal, using the first sensor signal. Similarly, the step of providing may be carried out dependent on a result of the plausibility determination. With this specific embodiment of the method, a measuring result of the pressure sensor may be checked for plausibility using data of the acceleration sensor, and conversely, a measuring result of the acceleration sensor may be checked for plausibility using data of the pressure sensor, which results in an advantageous increase in the reliability of detecting a collision, in particular due to the fact that different detection criteria are used for each of the two sensors.

In addition, in the step of carrying out the first threshold value comparison, at least one further signal feature of a further first sensor signal may be compared to the adaptation threshold value, and alternatively or additionally, in the step of carrying out the second threshold value comparison, at least one further signal feature of a further second sensor signal may be compared to the triggering threshold value, which is adapted using the threshold value adaptation value, for triggering the pedestrian protection means. The further first sensor signal may represent a pressure signal of a further pressure sensor of the vehicle and the further second sensor signal may represent an acceleration signal of a further acceleration sensor of the vehicle, or conversely, the further first sensor signal may represent an acceleration signal of a further acceleration sensor of the vehicle and the further second sensor signal may represent a pressure signal of a further pressure sensor of the vehicle. Due to the use of multiple sensors of the same type, this specific embodiment of the method also offers an easily implementable option for checking the plausibility of detected sensor signals.

According to one specific embodiment, the signals of the at least one acceleration sensor may be provided, for example, by additional acceleration sensors of the vehicle, such as PCSs or so-called upfront sensors (UFS for short), and introduced into the restraint means algorithm in order to be included there in the decision for activating the pedestrian protection means. The inclusion, provided herein, of the signals of acceleration sensors in the trigger algorithm is easily implementable, since acceleration sensors such as UFSs for front end collision recognition, for example, are already installed in many vehicles. This may similarly apply for the combination of PTSs and UFSs, and for the combination of PCSs and UFSs.

In one refinement of the approach provided here, the signals of the acceleration sensors may also be used for a plausibility check of the pressure tube signals. In this way, even when there is a defective PTS, for example the right or the left pressure sensor, a decision for activating the pedestrian protection means may be made when a plausibility check is provided by an intact PTS pressure sensor, for example the left or the right pressure sensor, respectively, and at least one acceleration sensor. This may also apply for the opposite case when the PTS provides a plausibility check for the acceleration sensors. In addition, the plausibility check may also be provided by the UFS.

Using the concept provided here of expanding or adapting the trigger algorithm, the triggering performance of a restraint system, for example pressure tube-based, which is present in a vehicle may be improved in such a way that accidental deployments within the restraint means algorithm may be minimized, and at the same time, pedestrians or other objects may be better recognized as such over a preferably large bumper area. Conversely, non-triggering objects may also be better recognized as such, thus avoiding an accidental deployment of the active pedestrian protection means. Acceleration sensors such as UFSs which are already installed in the vehicle or acceleration sensors installed specifically for this purpose, such as PCSs, may be used for better classification of the collision objects. The acceleration sensors which are present may also be used for ensuring the plausibility check of the pressure signals, even in the event of a failure of a PTS. Thus, residual performance of the algorithm is still present even when a PTS sensor fails. This may also be understood for the combination of PCSs and UFSs, corresponding to the combination of PTSs and PCSs or PTSs and UFSs.

Furthermore, a device for activating a pedestrian protection means of a vehicle is provided, the device including the following features:

a first execution device for carrying out a first threshold value comparison, in the first threshold value comparison at least one signal feature of a first sensor signal being compared to an adaptation threshold value;

a determination device for determining a threshold value adaptation value based on a result of the threshold value comparison; and a second execution device for carrying out a second threshold value comparison, in the second threshold value comparison at least one signal feature of a second sensor signal being compared to a triggering threshold value, which is adapted using the threshold value adaptation value, for triggering the pedestrian protection means, the first sensor signal representing a pressure signal of a pressure sensor of the vehicle and the second sensor signal representing an acceleration signal of an acceleration sensor of the vehicle, or the first sensor signal representing an acceleration signal of an acceleration sensor of the vehicle and the second sensor signal representing a pressure signal of a pressure sensor of the vehicle.

The device may be designed for carrying out, controlling, or implementing the steps of one variant of a method provided here for activating a pedestrian protection means in its corresponding units. The object underlying the present invention may also be achieved quickly and efficiently by this embodiment variant of the present invention in the form of a device. The device may be coupled to the pedestrian protection means via a line system of the vehicle, for example a CAN bus.

In the present context, a device may be understood to mean an electrical device which processes sensor signals and outputs control and/or data signals as a function thereof. The device may have an interface which may have a hardware and/or software design. In a hardware design, the interfaces may be part of a so-called system ASIC, for example, which contains various functions of the device. However, it is also possible for the interfaces to be dedicated, integrated circuits, or to be at least partially composed of discrete components. In a software design, the interfaces may be software modules which are present on a microcontroller, for example, in addition to other software modules.

In addition, a restraint system for a vehicle is provided which includes the following features:
a device according to one of the specific embodiments described above;
at least one pressure sensor for providing a pressure signal to the device and at least one acceleration sensor for providing an acceleration signal to the device, the at least one pressure sensor being integratable into a bumper of the vehicle; and
a pedestrian protection means, coupled to the device, for protecting a person colliding with the vehicle.

Also advantageous is a computer program product or computer program having program code which may be stored on a machine-readable carrier or storage medium such as a semiconductor memory, a hard drive, or an optical memory, and used for carrying out, implementing, and/or controlling the steps of the method according to one of the above-described specific embodiments, in particular when the program product or program is executed on a computer or a device.

DETAILED DESCRIPTION

In the following description of advantageous exemplary embodiments of the present invention, identical or similar reference numerals are used for the elements having a similar action which are illustrated in the various figures, and a repeated description of these elements is dispensed with.

Figure 1:
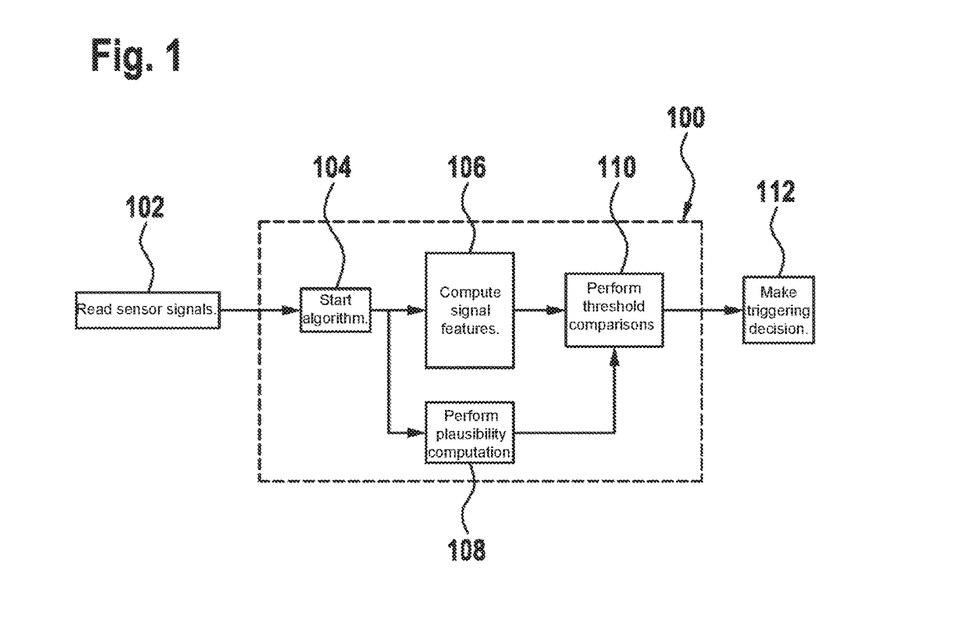
FIG. 1 shows a flow chart of a PTS-based pedestrian protection algorithm.

FIG. 1 shows an example of the design and mode of operation of a pure PTS-based pedestrian protection algorithm 100 together with associated input variables and the signal processing sequence. Pressure tube-based pedestrian protection algorithm 100 shown in FIG. 1 is based on a PTS. Two pressure sensors, a first pressure sensor situated on the right side of a bumper and a second pressure sensor situated on the left side of a bumper, are connected to one another via a silicone tube. A PTS signal of the first pressure sensor and a PTS signal of the second pressure sensor are read in a step 102, whereupon the algorithm is started in a step 104. Signal processing for computing features of the signals is carried out in a step 106, and at the same time, a plausibility computation of the read-in signals takes place in a step 108. Threshold comparisons of the computed signal features are carried out with the aid of a decision logic system in a step 110, on the basis of which a triggering decision for triggering the pedestrian protection device is made in a step 112.

The plausibility check of one of the pressure tube signals, for example of the right PTS, in step 108 takes place here via the oppositely situated pressure tube signal, for example of the left PTS. To carry out the necessary classification of a collision object within algorithm 100, the processed signals, for example raw signals, window integrals, integrals, derivatives, etc., are compared to thresholds in step 110. If one or multiple relevant signals exceed(s) its/their threshold, in the case shown in FIG. 1 the collision object is most likely a pedestrian, and the active pedestrian protection means is set off. Using the approach described here, a plausibility check is possible even if one of the two PTSs (left or right) fails.

Figure 2:
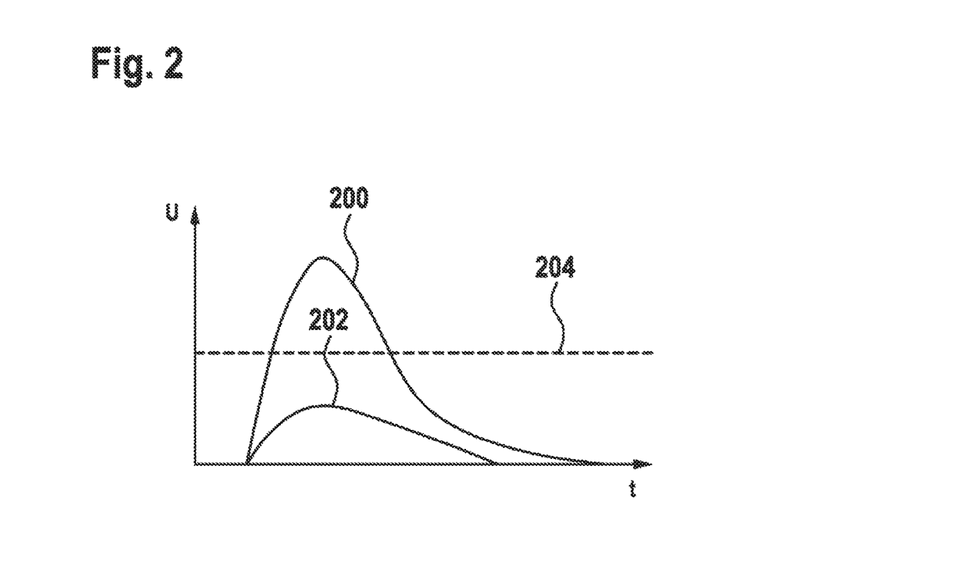
FIG. 2 shows examples of signal patterns of the PTS-based pedestrian protection algorithm.

FIG. 2 shows an example of a threshold comparison of a signal feature of a PTS signal within the decision logic system of the PTS-based pedestrian protection algorithm from FIG. 1. A first signal pattern 200 and a second signal pattern 202 are shown as a function of a trigger threshold 204 of the pressure tube-based pedestrian protection algorithm over time. First signal pattern 200 represents the signal feature of the PTS feature generated during a collision with a pedestrian, and second signal pattern 202 represents the signal feature of the PTS feature generated during a collision with a small animal. As shown in the illustration in FIG. 2, signal feature 200 which is based on a pedestrian collision has a higher amplitude than, for example, signal feature 202 during a collision with a small animal. Within the algorithm, each signal feature is compared to fixed threshold 204. Signal amplitudes 200, 202 are subdivided by threshold 204 into the areas "pedestrian" and "nonpedestrian." In particular, in the example shown, signal pattern 202 which represents the small animal collision remains below trigger threshold 204, as the result of which no triggering decision is made.

Figure 3:
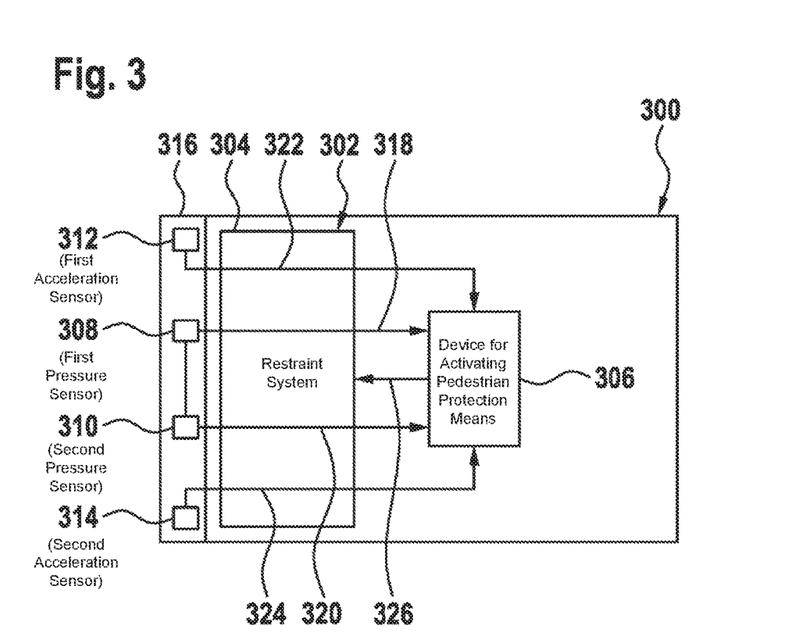
FIG. 3 shows a schematic illustration of a vehicle which includes a restraint system according to one exemplary embodiment of the present invention.

FIG. 3 shows a schematic illustration of a vehicle 300 which includes a restraint system 302 according to one exemplary embodiment of the present invention. Vehicle 300 may be an on-road vehicle such as a passenger vehicle or a truck. Restraint system 302 is made up of a pedestrian protection means 304, a device 306 for activating pedestrian protection means 304, and a first pressure sensor 308, a second pressure sensor 310, a first acceleration sensor 312, and a second acceleration sensor 314. The sensing range of sensors 308, 310, 312, 314, for example in the form of PTS/PCS/UFS sensors, may by all means also overlap. This means that acceleration sensors 312, 314 do not necessarily have to be situated in the outer area.

In the exemplary embodiment shown in FIG. 3, pedestrian protection means 304 is designed as an active hood of vehicle 300. Other designs of pedestrian protection means 304 are also conceivable. In the present case, all sensors 308, 310, 312, 314 of restraint system 302 are integrated into a bumper 316, the front bumper here, of vehicle 300. Sensors 308, 310, 312, 314 may alternatively or additionally be situated on or in the rear bumper of vehicle 300. First pressure sensor 308 and second pressure sensor 310 are situated in a middle area of bumper 316, and are connected via a silicone tube, which in the present case is filled with air. First acceleration sensor 312 is situated in a right edge area of bumper 316, and second acceleration sensor 314 is situated in a left edge area of bumper 316.

First pressure sensor 308 is designed for providing a first pressure signal 318 to device 306 via a suitable interface, and second pressure sensor 310 is designed for providing a second pressure signal 320 to device 306 via a suitable interface. First acceleration sensor 312 is designed for providing a first acceleration signal 322 to device 306 via a suitable interface, and second acceleration sensor 314 is designed for providing a second acceleration signal 324 to device 306 via a suitable interface. Device 306 is designed for making a triggering decision for triggering pedestrian protection means 304, based on signals 318, 320, 322, 324, and correspondingly outputting a triggering or activation signal 326 to pedestrian protection means 304 via a suitable interface.

In the exemplary embodiment shown in FIG. 3, acceleration sensors 312, 314 are so-called pedestrian collision sensors (PCS for short) which are specifically designed for detecting a person colliding with a vehicle. Alternatively, acceleration-based sensors 312, 314 may be so-called upfront sensors (UFS for short), which in particular for head-on collision recognition are already installed in many vehicles, in most cases in the outer area of bumper 316. According to other exemplary embodiments, PCSs in addition to UFSs may be used. According to other exemplary embodiments, acceleration sensors 312, 314, unlike the exemplary embodiment shown in FIG. 3, may also be installed in the middle area of vehicle 300.

Installing acceleration sensors 312, 314 in the middle area of vehicle 300 is advantageous when the vehicle structure in this area results in much lower pressure signals at the pressure tube-based system which includes first pressure sensor 308 and second pressure sensor 310. A pedestrian collision in the area of one of acceleration sensors 312, 314 results in a relatively high signal level at corresponding acceleration sensors 312, 314. This is advantageous in particular in the outer area of bumper 316, since at this location the pressure signals of the pressure-based system which includes first pressure sensor 308 and second pressure sensor 310 may be relatively low. In addition to using UFS sensors which are present, it is conceivable to additionally install PCS sensors in vehicle bumper 316 for improving the triggering performance of the pressure tube-based pedestrian protection algorithm.

An essential prerequisite for a plausibility check of the decision for triggering pedestrian protection means 304 is the presence of relevant signals on two independent sensors 308, 310, 312, 314. This is provided on the one hand by using first or right pressure sensor 308 and second or left pressure sensor 310, when both sensors 308, 310 are functioning properly. On the other hand, however, acceleration sensors 312, 314 which are present may also be used for the plausibility check of pressure signals 318, 320. In this case, the plausibility check of the triggering or setting off decision may then take place via both pressure tube sensors 308, 310, or via first PTS sensor 308 and/or second PTS sensor 310 and at least one of acceleration sensors 312, 314.

Signals 318, 320, 322, 324 output by the sensor system are further processed in device 306 with the aid of suitable algorithms, with the aim of classifying a collision object as a pedestrian or a nonpedestrian. If the algorithm recognizes that the collision object is a pedestrian, active pedestrian protection means 304 is activated as a function of the vehicle speed in order to cushion the impact of the pedestrian on the front end of vehicle 300. However, if no pedestrian is recognized, active pedestrian protection means 304 is not set off. Further active pedestrian protection means in addition to active hood 304 may also be used.

Figure 4:
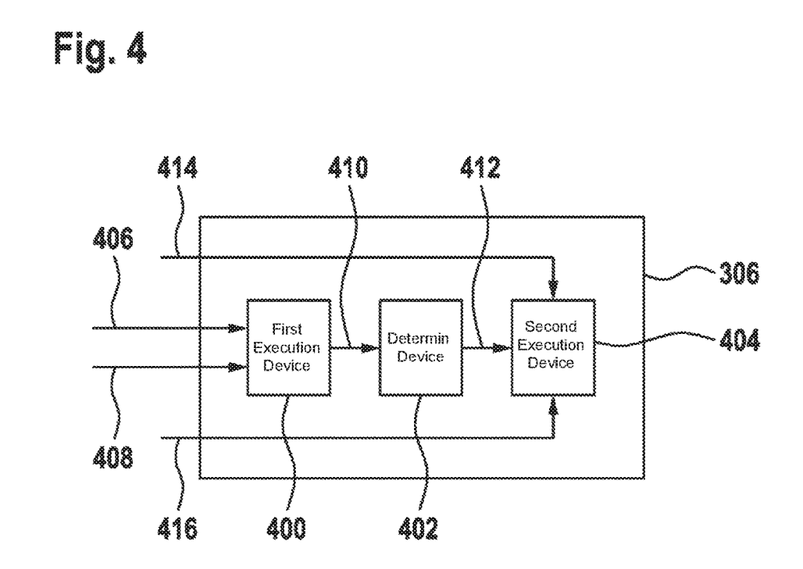
FIG. 4 shows a block diagram of a device for activating a pedestrian protection means, according to one exemplary embodiment of the present invention.

FIG. 4 shows a block diagram of one exemplary embodiment of device 306 for activating a pedestrian protection means from FIG. 3. Device 306 includes a first execution device 400, a determination device 402, and a second execution device 404.

First execution device 400 is designed for comparing a signal feature 406 of the first pressure signal provided to it, and a further signal feature 408 of the second pressure signal provided to it, to an adaptation threshold value in a first threshold value comparison. A result 410 of this first threshold value comparison is transmitted via a suitable interface to determination device 402 which is designed for determining a threshold value adaptation value 412 based on result 410, and for providing this threshold value adaptation value to second execution device 404 via a suitable interface. Second execution device 404 is designed for adapting a triggering threshold value, using threshold value adaptation value 412, for triggering the pedestrian protection means, and comparing a signal feature 414 of the first acceleration signal provided to it, and a further signal feature 416 of the second acceleration signal provided to it, to the adapted triggering threshold value in a second threshold value comparison.

According to another exemplary embodiment, the reverse case may be implemented; i.e., to initially determine threshold value adaptation value 412, based on signal features 414, 416 of the acceleration signals, and to subsequently evaluate signal features 406, 408 of the pressure signals, using the threshold value adaptation value. This covers the case PCS+PTS.

Figure 5:
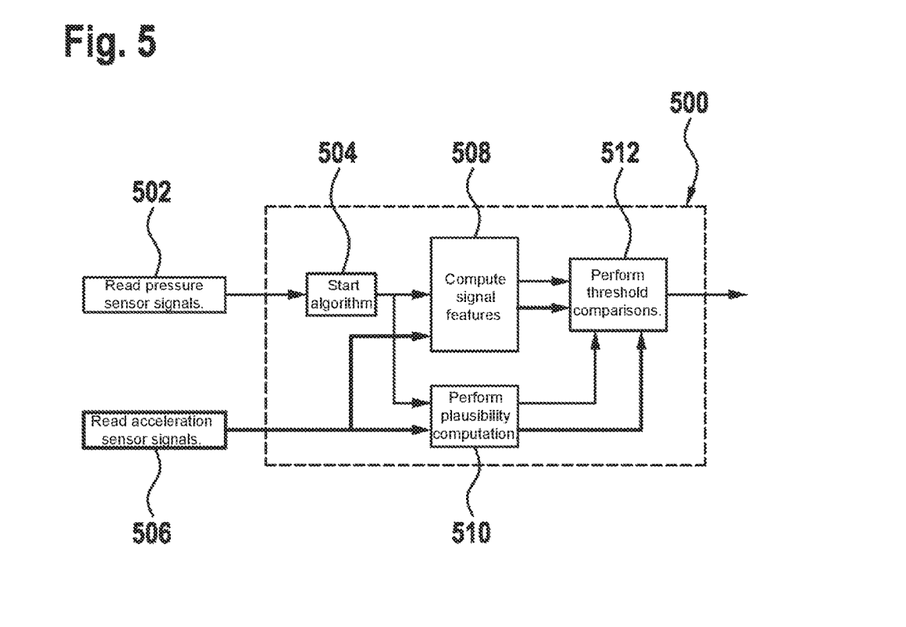
FIG. 5 shows a flow chart of a method for activating a pedestrian protection means of a vehicle, according to one exemplary embodiment of the present invention.

FIG. 5 shows an example of a flow chart of a method 500 for activating a pedestrian protection means of a vehicle. In the exemplary embodiment shown in FIG. 5, method 500 is a PTS-based pedestrian protection algorithm which additionally takes into account signals provided by acceleration sensors according to the approach provided here.

The pressure signals of the right and left pressure sensors (PTSs) of the vehicle are read in a step 502. If the pressure signals meet predetermined conditions, algorithm 500 is started in a step 504. The acceleration signals of the acceleration sensors of the vehicle are read in a step 506. The acceleration signals may be provided by UFSs and/or PCSs of the vehicle. Steps 502 and 506 may be carried out simultaneously, or in a different sequence in succession.

Within the scope of signal processing, features of the pressure signals and of the acceleration signals are computed in a step 508 in order to determine the signal features of the pressure signals and of the acceleration signals, using a predefined determination rule. According to exemplary embodiments, the predefined determination rule may be a filtering of the pressure signals and acceleration signals, a determination of an integral and/or of a window integral of the pressure signals and acceleration signals, or a determination of a derivative of the pressure signals and acceleration signals. At the same time as step 508, a plausibility computation or determination of the pressure signals using the acceleration signals takes place in a step 510, and a plausibility computation or determination of the acceleration signals takes place using the pressure signals. According to exemplary embodiments, the plausibility determination may take place either via the respective oppositely situated PTS sensor or via at least one additional UFS/PCS sensor.

Based on the feature computation in step 508 and the plausibility computation in step 510, within the scope of a decision logic system, threshold value comparisons of the computed signal features to threshold values which are relevant for activating the person protection means are carried out in a step 512. A result of the threshold value comparisons is crucial for a subsequent decision concerning whether or not an activation of the person protection means is indicated.

The process sequence of PTS-based pedestrian protection algorithm 500 provided here, illustrated in FIG. 5, is characterized by a merger of pressure tube-based and acceleration-based pedestrian protection recognition and correspondingly adapted signal processing. The illustration roughly shows the signal pattern within algorithm 500 which enters into a triggering decision of the active pedestrian protection means or the active pedestrian protection means. Depending on the application mode of method 500, either respective independent signal features of the pressure or acceleration signals may be computed for assisting the setting off decision, which are subsequently compared to their own thresholds, or the thresholds of the pressure tube-based features which are present are adapted as a function of the acceleration signals.

As shown in the illustration in FIG. 5, the measured sensor signals of the pressure tube are used as input variables in step 502 of reading in. If certain conditions are met in the signal patterns, processing of the sensor signals within algorithm 500 begins with the start of the algorithm in step 504. The so-called signal features are computed within this processing in step 508. These are, for example, filtered signals, window integrals, integrals, derivatives, and other features. The computed signal features are compared to thresholds within the decision logic system in step 512. Based on the exceedance of the thresholds, a triggering decision of the active pedestrian protection means is made in conjunction with the plausibility check carried out in step 510.

Particulars of expanded pedestrian protection algorithm 500 provided herein lie in the use of the additional input variables of the acceleration signals and in the signal evaluation and use of the new input variables in pedestrian protection algorithm 500. Within the new signal evaluation, inherent features such as filtered signals, window integrals, integrals, derivatives, and other features, as well as the plausibility are computed from the acceleration signals. The features of the pressure tube-based and acceleration-based signals are subsequently compared to proprietary thresholds.

According to one alternative exemplary embodiment, method 500 may also be carried out as a PCS- or UFS-based pedestrian protection algorithm, the signals of the pressure sensors being used for assisting the setting off decision. In that case, the acceleration signals of the acceleration sensors of the vehicle are read in step 502, and the pressure signals of the pressure sensors of the vehicle are read in step 506. The subsequent steps of the method are then carried out as described, using the read-in signals, in order to reach the setting off decision.

The functionality of merged pedestrian protection algorithm 500 provided here is described in greater detail based on two alternative application scenarios, with reference to the figures explained below.

Figure 6:
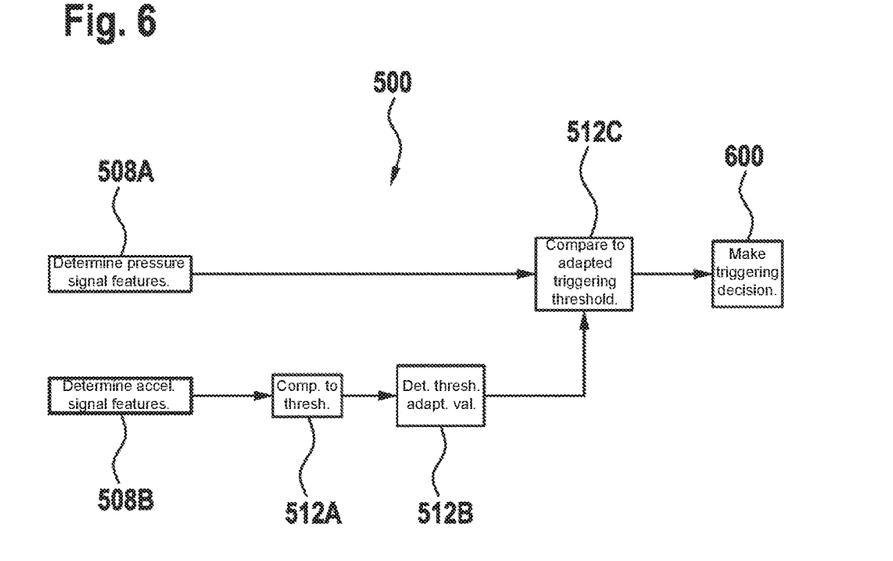
FIG. 6 shows a flow chart of a portion of the method from FIG. 5 concerning the processing of the signal features, in a first mode according to one exemplary embodiment of the present invention.

FIG. 6 shows, with reference to a flow chart, one exemplary embodiment of the portion of the method provided in FIG. 5 which concerns in particular step 512 of the threshold value comparisons. FIG. 6 shows this method portion in a first example of an execution mode or application scenario in which the signal features of the acceleration signals enter as additional features into the threshold adaptation of the pressure tube-based signal features.

The method portion shown in FIG. 6 begins with a step 508A of determining the signal features of the pressure signals provided by the pressure sensors (PTSs) of a vehicle, and a step 508B of determining the signal features of the acceleration signals provided by acceleration sensors (UFSs and/or PCSs) of the vehicle. Within the scope of the threshold value comparisons of pedestrian protection algorithm 500 provided here, a first threshold value comparison is carried out in a step 512A, in which the signal features of the acceleration signals are compared to an adaptation threshold value. Based on a result of the first threshold value comparison in step 512A, a threshold value adaptation value is determined in a step 512B. A second threshold value comparison is carried out in a step 512C, in which the signal features of the pressure signals are compared to a triggering threshold value, which is adapted using the threshold value adaptation value, for triggering the pedestrian protection means. A result of the second threshold value comparison in step 512C is provided in a step 600 as a decision for activating the pedestrian protection means.

If, according to one alternative exemplary embodiment, pedestrian protection algorithm 500 is applied as an acceleration-based pedestrian protection algorithm, conversely, in the portion of the method provided in FIG. 5 which concerns in particular step 512 of the threshold value comparisons, an adaptation of the PCS feature thresholds is carried out via the PTS/UFS features.

Similarly, the signal features of the acceleration signals provided by the PCSs and/or UFSs or acceleration sensors of the vehicle are defined in step 508A, and the signal features of pressure signals provided by the pressure sensors (PTSs) of the vehicle are defined in step 508B. Correspondingly, the signal features of the pressure signals are compared to an adaptation threshold value in step 512A of the first threshold value comparison in order to determine, based on the result, the threshold value adaptation value in step 512B. The signal features of the acceleration signals are compared to a triggering threshold value, which is adapted using the threshold value adaptation value, for triggering the pedestrian protection means, in step 512C of the second threshold value comparison. Here as well, a result of the second threshold value comparison in step 512C is provided in step 600 as a decision for activating the pedestrian protection means.

Threshold comparisons 512A, 512C, as clearly explained for FIG. 6, similarly take place for the other signal features within algorithm 500. Thresholds which are tailored to the particular signal features are used.

In the scenario explained with reference to the illustration in FIG. 6, the thresholds of the pressure tube-based features are adapted as a function of the features of the acceleration signals. If the acceleration-based features have a sufficient signal, the thresholds of the pressure tube-based features, for example, may be gradually reduced, thus making the triggering decision more sensitive. This is explained once more with reference to FIG. 8, described below. A robust adaptation of the pressure tube-based feature thresholds as a function of the acceleration signals is also conceivable. Conversely, the thresholds of the acceleration-based features may likewise be adapted as a function of the pressure tube-based features.

Figure 7:
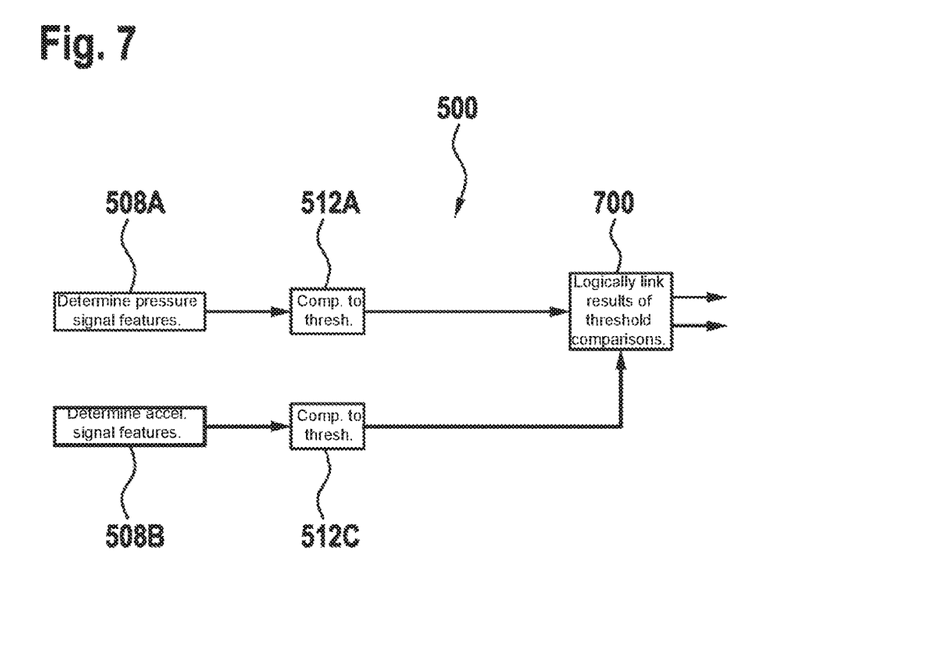
FIG. 7 shows a flow chart of the portion of the method from FIG. 5, in a second mode according to one exemplary embodiment of the present invention.

FIG. 7 shows an alternative example of an execution mode, with reference to another flow chart in which a setting off decision is made, based on one result each of the threshold comparisons of the PTS, UFS, and PCS features and a logical linkage of the results.

The same as for the scenario illustrated with reference to FIG. 6, the signal features of the pressure signals provided by the pressure sensors (PTSs) of the vehicle are computed in step 508A, and the signal features of the acceleration signals provided by the PCSs and/or UFSs or acceleration sensors of the vehicle are computed in step 508B. Within the scope of the first threshold value comparison, the signal features of the pressure signals are compared to a pressure signal threshold value in step 512A. Within the scope of the second threshold value comparison, the signal features of the acceleration signals are compared to an acceleration signal threshold value in step 512C.

A threshold value adaptation does not take place here. Instead, a logical linkage of the results of the first threshold value comparison and of the second threshold value comparison is carried out in a step 700, on the basis of which a decision regarding activation of the pedestrian protection means is provided. If, for example, an exceedance of the pressure signal threshold value is established in step 512A, and an exceedance of the acceleration signal threshold value is established in step 512C, as the result of the logical linkage in step 700 the decision is made to trigger the pedestrian protection means. This exemplary embodiment is selected only as an example, and does not preclude other linkages.

In the scenario explained with reference to FIG. 7, the triggering decision is thus based on the logical linkage of the feature queries of all participating sensors in step 700.

Figure 8:
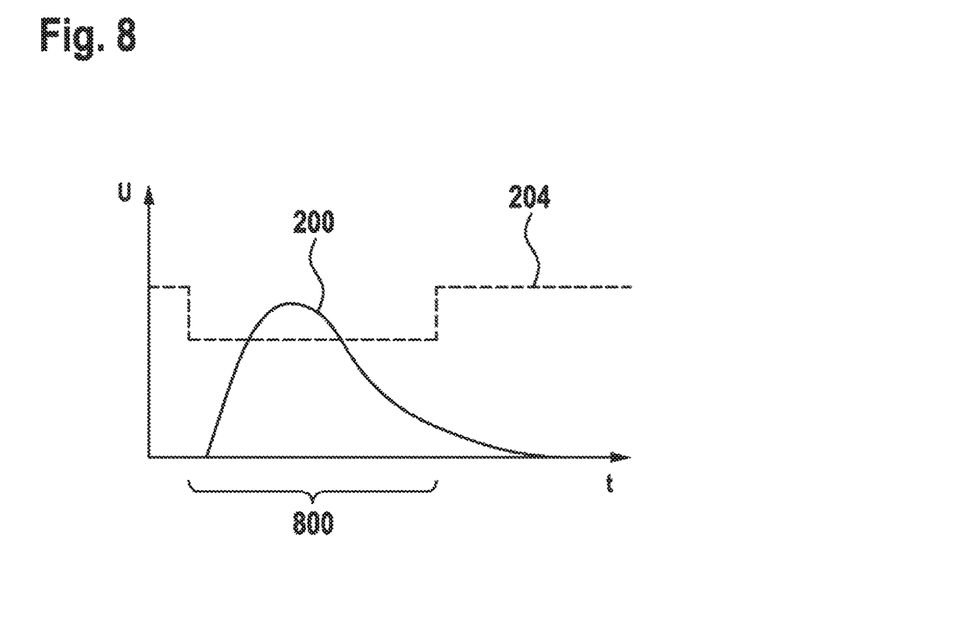
FIG. 8 shows an illustration of a threshold value adaptation of a triggering threshold value of a pedestrian protection means of a vehicle, according to one exemplary embodiment of the present invention.

FIG. 8 shows one exemplary embodiment of a threshold adaptation for a PTS feature with the aid of the acceleration signals, according to the method portion of the pedestrian protection algorithm provided here, with reference to FIG. 6.

A Cartesian coordinate system is shown in which time t is plotted on the abscissa and amplitude value u is plotted on the ordinate. The same as in FIG. 2, signal pattern 200 once again represents the signal feature of the PTS feature generated during a collision with a pedestrian. As shown in the illustration, the triggering threshold value for triggering the pedestrian protection means has been adapted over a predefined time window 800, using the threshold value adaptation value, in such a way that at the amplitude of the PTS signal provided in FIG. 8, the triggering criterion for activating the pedestrian protection means is met, since triggering or activation threshold value 204 is exceeded by signal pattern 200 of the PTS feature.

Thus, FIG. 8 clearly shows how the approach provided here allows a more sensitive evaluation of the collision values provided by vehicle sensors. The correct decision may thus be made more often in a case illustrated as an example with reference to FIG. 8, in which signal pattern 200 is situated in the boundary zone between the trigger area and the non-trigger area, using additional sensors. The situation may be prevented in which the trigger threshold is just missed. Conversely, in an application of the pedestrian protection algorithm in which the thresholds must be set very low due to external base conditions, the situation may be prevented that non-triggering objects in the threshold border area result in triggering.

In the exemplary embodiment shown in FIG. 8, the threshold adaptation takes place in fixed time window 800, provided that the threshold value adaptation value is set. The threshold adaptation may take place gradually according to other exemplary embodiments.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, the method steps provided here may be repeated, and carried out in a sequence different from that described.

If an exemplary embodiment includes an "and/or" linkage between a first feature and a second feature, this is to be construed in such a way that according to one specific embodiment, the exemplary embodiment includes the first feature as well as the second feature, and according to another specific embodiment includes only the first feature or only the second feature.

What is claimed is:

1. A method for activating a pedestrian protection system for a vehicle, the method comprising:
   receiving, by an electrical device, a first sensor signal and a second sensor signal;
   carrying out, by the electrical device, a first threshold value comparison, in the first threshold value comparison at least one signal feature of the first sensor signal being compared to an adaptation threshold value, the at least one signal feature including at least one of: a raw value of the first sensor signal, a filtered value based on the first sensor signal, an integral based on the first sensor signal, or a derivative based on the first sensor signal;
   determining, by the electrical device, a threshold value adaptation value based on a result of the first threshold value comparison;
   carrying out; by the electrical device, a second threshold value comparison, in the second threshold value comparison at least one signal feature of the second sensor signal being compared to a triggering threshold value that is adapted using the threshold value adaptation value and is for triggering the pedestrian protection system; and
   triggering, by the electrical device, the pedestrian protection system based on a result of the comparison of the at least one signal feature of the second sensor signal to the adapted triggering threshold value;
   wherein:
   the first sensor signal represents one of a pressure signal of a pressure sensor of the vehicle and an acceleration signal of an acceleration sensor of the vehicle, and
   the second sensor signal represents the other one of the pressure signal of the pressure sensor of the vehicle and the acceleration signal of the acceleration sensor of the vehicle.

2. The method as recited in claim 1, further comprising providing a result of the second threshold value comparison as a decision for activating the pedestrian protection system.

3. The method as recited in claim 1, further comprising at least one of:
   determining the at least one signal feature of the first sensor signal from the first sensor signal, and
   determining the at least one signal feature of the second sensor signal from the second sensor signal, using a predefined determination rule.

4. The method as recited in claim 3, wherein the predefined determination rule includes one of:
   filtering at least one of the first sensor signal and the second sensor signal,
   determining an integral of at least one of the first sensor signal and the second sensor signal, determining a window integral of at least one of the first sensor signal and the second sensor signal, and
determining a derivative of at least one of the first sensor signal and the second sensor signal.

5. The method as recited in claim 2, further comprising at least one of:
carrying out a first plausibility determination of the first sensor signal, using the second sensor signal; and
carrying out a second plausibility determination of the second sensor signal, using the first sensor signal, the providing of the result being carried out dependent on a result of at least one of the first and second plausibility determinations.

6. The method as recited in claim 1, wherein:
at least one of:
in the step of carrying out the first threshold value comparison, at least one further signal feature of a further first sensor signal is compared to the adaptation threshold value, and
in the step of carrying out the second threshold value comparison, at least one further signal feature of a further second sensor signal is compared to the triggering threshold value, which is adapted using the threshold value adaptation value, for triggering the pedestrian protection system,
the further first sensor signal represents one of a pressure signal of a further pressure sensor of the vehicle and an acceleration signal of a further acceleration sensor of the vehicle,
the further second sensor signal represents one of the pressure signal of the further pressure sensor of the vehicle and the acceleration signal of the further acceleration sensor of the vehicle.

7. A device for activating a pedestrian protection system for a vehicle, the device comprising:
a first execution device for carrying out a first threshold value comparison, in the first threshold value comparison at least one signal feature of a first sensor signal being compared to an adaptation threshold value, the at least one signal feature including at least one of: a raw value of the first sensor signal, a filtered value based on the first sensor signal, an integral based on the first sensor signal, or a derivative based on the first sensor signal;
a determination device for determining a threshold value adaptation value based on a result of the first threshold value comparison; and
a second execution device for carrying out a second threshold value comparison, in the second threshold value comparison at least one signal feature of a second sensor signal being compared to a triggering threshold value that is adapted using the threshold value adaptation value and is for triggering the pedestrian protection system, wherein:
the first sensor signal represents one of a pressure signal of a pressure sensor of the vehicle and an acceleration signal of an acceleration sensor of the vehicle, and
the second sensor signal represents the other one of the pressure signal of the pressure sensor of the vehicle and the acceleration signal of the acceleration sensor of the vehicle.

8. A restraint system for a vehicle, comprising:
a pedestrian protection system for protecting a person colliding with the vehicle;
a device coupled to the pedestrian protection system and for activating the pedestrian protection system, the device comprising:
a first execution device for carrying out a first threshold value comparison, in the first threshold value comparison at least one signal feature of a first sensor signal being compared to an adaptation threshold value, the at least one signal feature including at least one of: a raw value of the first sensor signal, a filtered value based on the first sensor signal, an integral based on the first sensor signal, or a derivative based on the first sensor signal;
a determination device for determining a threshold value adaptation value based on a result of the first threshold value comparison; and
a second execution device for carrying out a second threshold value comparison, in the second threshold value comparison at least one signal feature of a second sensor signal being compared to a triggering threshold value that is adapted using the threshold value adaptation value and is for triggering the pedestrian protection system, wherein:
the first sensor signal represents one of a pressure signal of a pressure sensor of the vehicle and an acceleration signal of an acceleration sensor of the vehicle, and
the second sensor signal represents the other one of the pressure signal of the pressure sensor of the vehicle and the acceleration signal of the acceleration sensor of the vehicle;
at least one pressure sensor for providing the pressure signal to the device; and
at least one acceleration sensor for providing the acceleration signal to the device, the at least one pressure sensor being integratable into a bumper of the vehicle.

9. A non-transitory machine-readable storage medium which includes stored thereon a computer program which is configured for carrying out a method for activating a pedestrian protection system for a vehicle, the method comprising:
carrying out a first threshold value comparison, in the first threshold value comparison at least one signal feature of a first sensor signal being compared to an adaptation threshold value, the at least one signal feature including at least one of: a raw value of the first sensor signal, a filtered value based on the first sensor signal, an integral based on the first sensor signal, or a derivative based on the first sensor signal;
determining a threshold value adaptation value based on a result of the first threshold value comparison; and
carrying out a second threshold value comparison, in the second threshold value comparison at least one signal feature of a second sensor signal being compared to a triggering threshold value that is adapted using the threshold value adaptation value and is for triggering the pedestrian protection system, wherein:
the first sensor signal represents one of a pressure signal of a pressure sensor of the vehicle and an acceleration signal of an acceleration sensor of the vehicle, and
the second sensor signal represents the other one of the pressure signal of the pressure sensor of the vehicle and the acceleration signal of the acceleration sensor of the vehicle.

10. The method as recited in claim 1, wherein the pressure sensor and acceleration sensor are situated on a bumper of the vehicle.

11. The method as recited in claim 1, wherein the pressure sensor is situated on a middle area of a bumper of the vehicle, and the acceleration sensor is situated on a left or right edge area of the bumper of the vehicle.

\* \* \* \* \*